(12) United States Patent
Boe et al.

(10) Patent No.: US 7,086,677 B2
(45) Date of Patent: Aug. 8, 2006

(54) VERTICAL TRANSPORT LIFT FOR MOVING CONTAINERS FROM DECK TO DECK IN A COMMERCIAL AIRCRAFT

(75) Inventors: Christian Boe, Farum (DK); Anders Jensen, Alleroed (DK); Thomas Lund, Vedbaek (DK)

(73) Assignee: Airbus Deutschland GmbH, Hamburg (DE)

( * ) Notice: Subject to any disclaimer, the term of this patent is extended or adjusted under 35 U.S.C. 154(b) by 116 days.

(21) Appl. No.: 10/783,948

(22) Filed: Feb. 20, 2004

(65) Prior Publication Data

US 2004/0188564 A1 Sep. 30, 2004

(30) Foreign Application Priority Data

Feb. 24, 2003 (DE) ............... 103 07 957

(51) Int. Cl.
*B66C 1/00* (2006.01)
(52) U.S. Cl. .................. 294/81.51; 294/68.3
(58) Field of Classification Search ............ 294/81.51, 294/81.61, 67.31, 68.3; 187/207, 208; 244/118.1, 244/118.5
See application file for complete search history.

(56) References Cited

U.S. PATENT DOCUMENTS

| | | | | |
|---|---|---|---|---|
| 2,478,019 A | * | 8/1949 | Sonntag ................. | 410/68 |
| 3,257,142 A | * | 6/1966 | Barry ..................... | 294/81.21 |
| 3,695,667 A | * | 10/1972 | Dempsey ................ | 294/81.21 |
| 4,221,515 A | * | 9/1980 | Brown et al. ........... | 410/32 |
| 5,074,496 A | | 12/1991 | Rezag et al. | |
| 5,163,726 A | * | 11/1992 | Boos et al. ............. | 294/81.1 |
| 5,322,244 A | | 6/1994 | Dallmann et al. | |
| 6,152,287 A | | 11/2000 | Luria | |
| 2001/0045326 A1 | | 11/2001 | Gottlieb et al. | |
| 2005/0211832 A1 | | 9/2005 | Baatz | |

FOREIGN PATENT DOCUMENTS

| | | |
|---|---|---|
| DE | 199 55 801 | 6/2000 |
| DE | 102 04 892 | 8/2003 |

* cited by examiner

*Primary Examiner*—Eileen D. Lillis
*Assistant Examiner*—Esther Onyinyechi Okezie
(74) *Attorney, Agent, or Firm*—W. F. Fasse; W. G. Fasse

(57) ABSTRACT

A vertical lift system is constructed for transporting a receptacle, such as a food or supply receptacle from one deck to another deck, particularly in an aircraft. For this purpose, a vertical lift (71) is equipped with a number of lifting hooks (10) each mechanically coupled to a respective locking pawl (11). Each receptacle is equipped with a respective number of latch elements (9) such as recesses (92) to be engaged by a respective hook (10). The latching and unlatching is caused by the cooperation of the hooks (10) and pawls (11) with each other, with a stationary activating member (12) engaging a cam track (113) of a pawl (11), with biasing forces and with the latch elements (9). Latching requires a small downward motion of the vertical lift. Unlatching requires a slight further downward motion of the vertical lift. During latching and unlatching the receptacle (3) is supported on a floor (13).

14 Claims, 4 Drawing Sheets

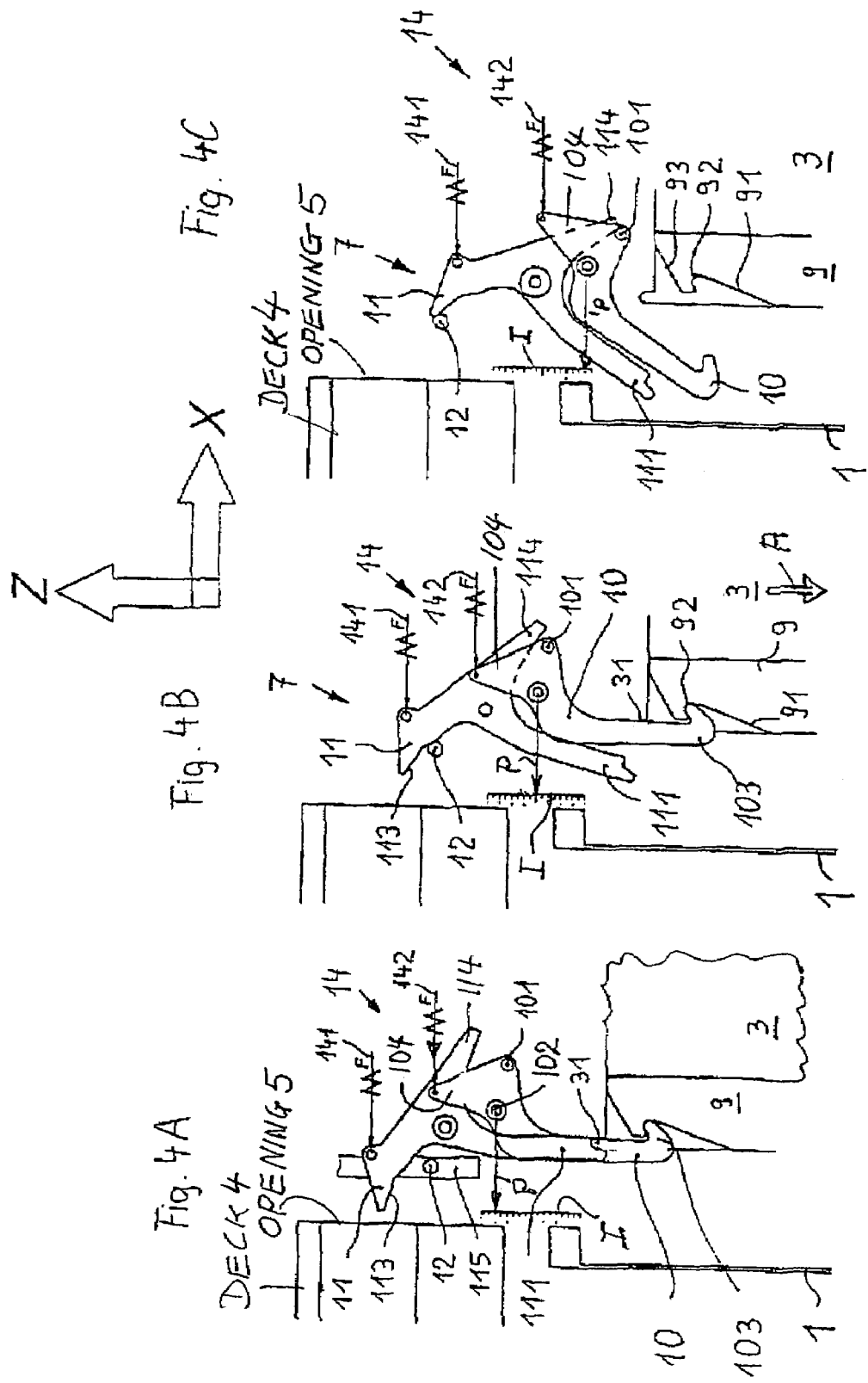

VERTICAL TRANSPORT LIFT FOR MOVING CONTAINERS FROM DECK TO DECK IN A COMMERCIAL AIRCRAFT

PRIORITY CLAIM

This application is based on and claims the priority under 35 U.S.C. §119 of German Patent Application 103 07 957.2 filed on Feb. 24, 2003, the entire disclosure of which is incorporated herein by reference.

FIELD OF THE INVENTION

The invention relates to a vertical overhead lift system for vertically transporting containers, particularly food and supply containers, from one deck to another in a commercial aircraft. The overhead lift is equipped with a plurality of gripping mechanisms for seizing a container and moving it vertically between two decks.

BACKGROUND INFORMATION

Particularly, in connection with jumbo commercial aircraft there is a need for storing supply containers such as food containers, referred to herein as receptacles, not only on the cabin deck, but also on the loading deck in the freight space below the cabin deck. It is preferred to store as many supply receptacles, particularly food receptacles on the lower deck in order to gain passenger space on the cabin deck. The basic conventional solution to the foregoing preference is to store food, beverages, and goods for sale to passengers in special receptacles which in turn are stored in lower deck freight containers having standard dimensions or standard cross-sectional dimensions, for example size LD6. The receptacles are then lifted out of the container by a vertical lift to an on board galley location on the cabin floor. The receptacles which are initially stored in the freight container are, for example lightweight boxes or wheel equipped trolleys for transporting food along the alleys of the passenger cabin. Transport cages holding several food receptacles may also be stored in the freight containers.

When loading an aircraft, the food and supply container in the form of a special freight container can be handled just as any other freight container and is thus moved into the freight space through an under-deck freight door. However, attention is paid to place the food holding freight container into a position below a galley. Thus, in front of or behind the food holding freight container other freight containers may be positioned on the freight deck. This is possible because during the loading the cross-sectional area of the freight space is not impaired by the food or supplies holding freight container as long as the latter is handled in its proper sequence for vertical alignment with a galley on the cabin deck. This proper sequence allows to provide the aircraft with but one freight door for each freight space. Further, vertical lifts must be so positioned on the cabin deck, that these lifts do not interfere with the horizontal loading motions on the freight space.

Germany Patent Publication DE 199 55 801 A1 shows, for example, a vertical transport lift equipped with a vertical mast and a transport basket movable up and down the mast. In one conventional lift construction a support plane is positioned below the lower mast mounting so that the transport basket can be lowered onto the support plane. For this lifting and lowering of the transport basket so-called lazy tongue lifts are used, functioning as a second conveying system independently of the lift operating along the mast. The lazy tongues grip the sides of the transport basket, whereby the scissors-type motion of the lazy tongues simultaneously lifts and guides the basket. This type of transport mechanism makes it possible to load and unload supply goods through a flap of the aircraft by vertical up and vertical down movements respectively. Such a conventional additional lazy-type transport mechanism however, does not have any transport safety features which, for example are absolutely necessary when the lazy tongues are to be operated during flight. Details of the function of such a lazy tongue gripper device are not described in any detail in the above German patent publication.

OBJECTS OF THE INVENTION

In view of the foregoing it is the aim of the invention to achieve the following objects singly or in combination:
- to improve a vertical lift for the vertical transport of receptacles in an aircraft in such a way that the gripping of a receptacle is achieved by simple gripper components which nevertheless assure a safe holding of the receptacle, such as a food receptacle;
- to assure an automatic motion sequence of the gripping and decoupling actions in response to a small portion of a vertical motion of the vertical lift;
- to assure that the gripper mechanism can handle a certain tolerance range with regard to a location where an engagement or a disengagement between lifting hooks and container latches can take place; and
- to avoid any interference of the vertical lift with any horizontal conveying system on the lower deck.

SUMMARY OF THE INVENTION

The above objects have been achieved according to the invention by a vertical lift system comprising the following features in combination. A vertical overhead lift on the cabin deck is equipped with a number of gripper mechanisms constructed for cooperation with latch elements of a receptacle to be transported. Each gripper mechanism on the lift cooperates with a corresponding latch element so that the number of gripper mechanism corresponds to the number of latching elements forming part of or attached to the receptacle. Each gripper mechanism comprises a respective lifting hook and a locking pawl which are mechanically coupled to each other in such a way, that the lifting hook locks onto a respective receptacle latch element for locking against forces horizontally effective while the locking pawl engages the receptacle against forces in a vertical direction. Thus, a receptacle, or rather a latch element of a receptacle, is clamped between the hook and the pawl of the respective gripping mechanism.

The gripping mechanism according to the invention provides a simple, yet reliable and tolerance accommodating coupling and decoupling between a receptacle and the vertical lift. The motion sequences of all components are mechanically coupled so that additional sensors and actuators are superfluous. For example, if a container is lowered in such a way that not the entire container bottom contacts the floor underneath simultaneously, the present gripper mechanism in cooperation with the latch elements assures that different bottom portions of the container may contact the underlying floor in sequence. Hence, some tilting of a receptacle is tolerated. Moreover, the present system is well equipped for cooperation with a horizontal conveying system, whereby again certain tolerances may be compensated.

Thus, tolerances are acceptable in the vertical as well as in the horizontal direction between the gripper mechanism and the latching elements.

BRIEF DESCRIPTION OF THE DRAWINGS

In order that the invention may be clearly understood, it will now be described in connection with example embodiments thereof, with reference to the accompanying drawings, wherein:

FIG. 4A is a view similar to that of FIG. 2 for describing the engagement function of the gripper mechanism whereby the engagement or latching steps have just been completed and the gripper components are shown in a receptacle locking or clamping position;

FIG. 4B is a side view illustrating the beginning of a disengagement of a lifting hook from a latch element of a receptacle after a slight further downward motion of the vertical lift which is only shown symbolically as a box in FIG. 3; and FIG. 4C shows the fully disengaged position of the gripper mechanism elements following a further downward motion of the vertical lift, whereby the receptacle is ready for removal by a horizontal conveyor system not shown.

DETAILED DESCRIPTION OF PREFERRED EXAMPLE EMBODIMENTS AND OF THE BEST MODE OF THE INVENTION

Figure 1:
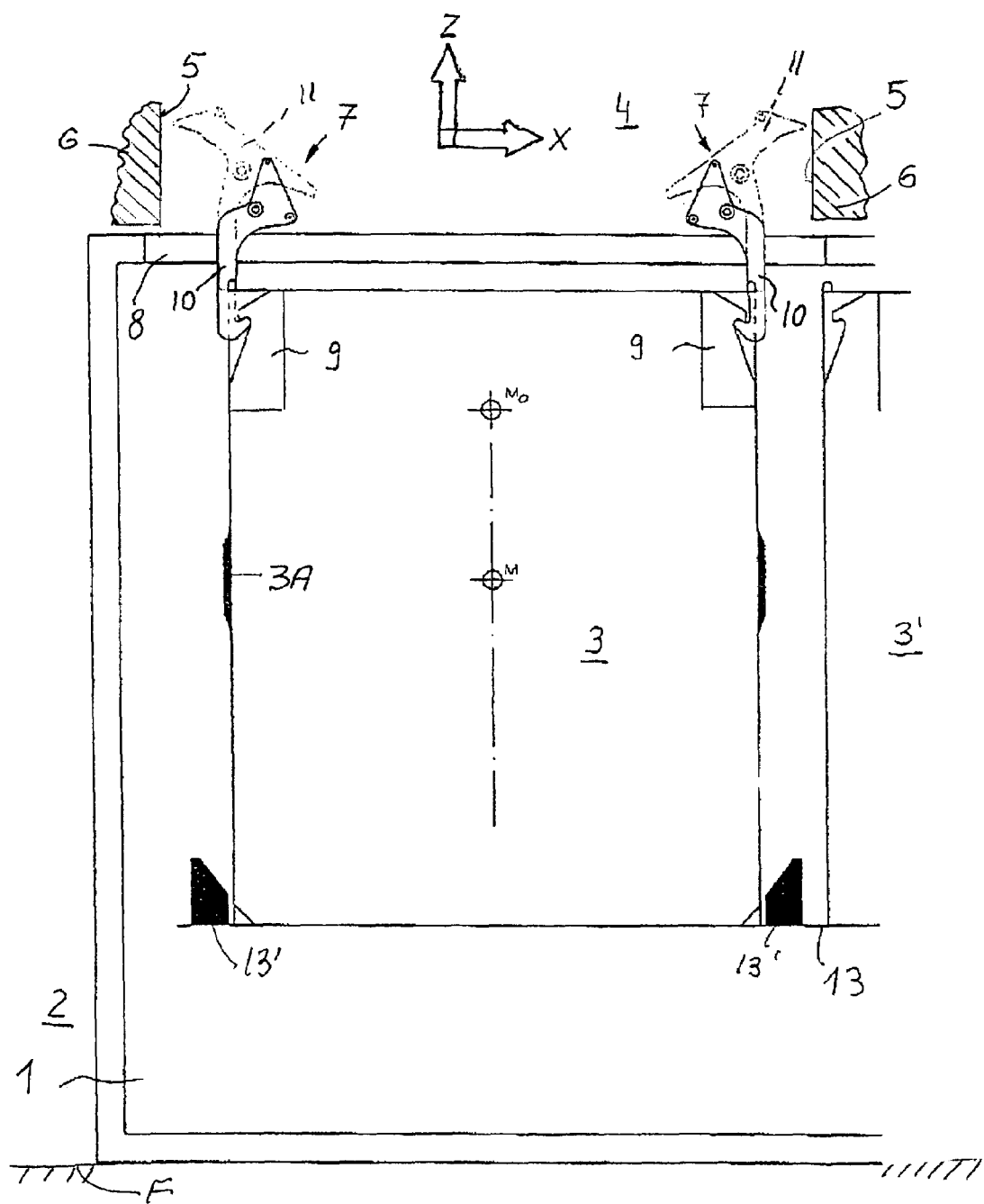
FIG. 1 shows a partially broken away side view of a container with a receptacle resting on an intermediate floor of the container, the receptacle is to be lifted vertically upwardly out of the container by a gripping mechanism forming part of a vertical lift (not shown)

The side view of FIG. 1 shows a portion of a freight container 1 used as a food supply container that holds a plurality of food or supply receptacles 3, 3'. The freight container 1 sits on the loading floor F in the loading space 2 of an aircraft. The food receptacles 3, 3' rest on an intermediate floor 13 in the container 1. Guides 13' assure that a container 3 is properly aligned below an opening 8 in the container 1 and below a vertical shaft 6 for a lift 71 symbolically shown in FIG. 3. The shaft 6 defines an open shaft space 5 wherein the lift 71 can move vertically up and down. The loading space 2 extends below the main deck 4 of the aircraft and holds food, freight and supply containers 1. The dimensions of the containers 1 are preferably the same as the dimensions of any other freight container so that handling is facilitated when the containers are moved through a freight door into the loading space 2 including into a space vertically below a galley on the main deck 4. The receptacles 3, 3' have smaller dimensions than the containers 1 and hold food, beverages, and other supply goods. The receptacles 3, 3' may be standard trolleys, boxes, crates or cages, all of which are equipped, according to the invention, with latch elements 9 for cooperation with gripper mechanisms 7 that form part of the vertical lift 71 and are movable vertically in the Z-direction with the respective movement of the lift 71 in the shaft space 5 while the freight containers 1 are movable in the X-, and Y-directions. The vertical lift 71 carries the gripper mechanisms 7 and each gripper mechanism comprises primarily a lifting hook 10 and a locking pawl 11. The number of gripper mechanisms 7 carried by the vertical lift 71 preferably corresponds to the number of latch elements 9 of the receptacles 3, 3'.

Figure 3:
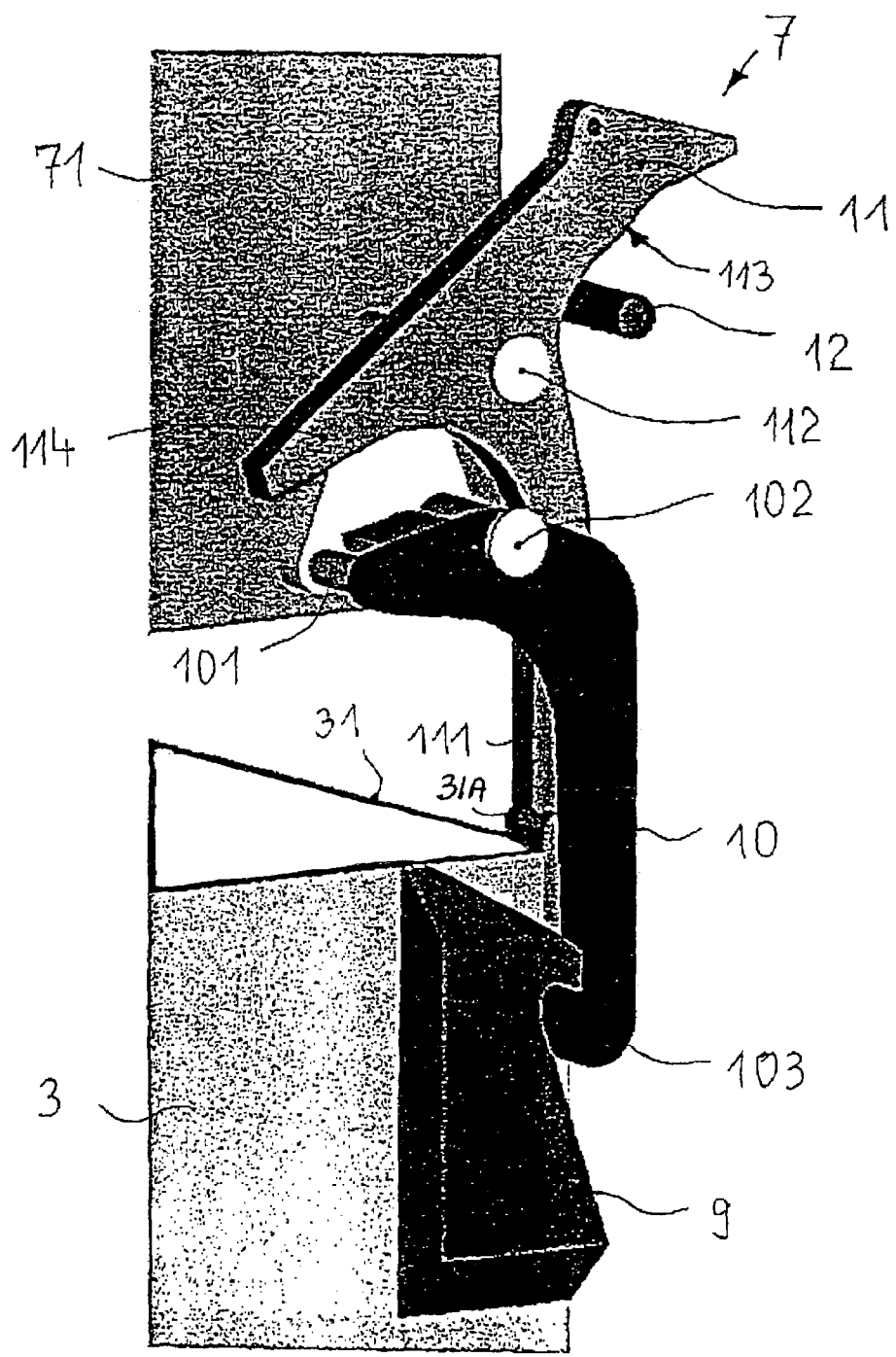
FIG. 3 is a perspective view of the primary gripper mechanism components or elements shown in FIG. 2.

Details of the vertical lift 71 symbolically shown in FIG. 3 are conventional, except for the gripping mechanisms 7. A vertical lift is, for instance disclosed in German Patent Publication DE 102 04 892.4. Such lifts are mounted overhead for movement up and down in the lift shaft 6. The shaft 6 is mounted on the cabin floor of the upper deck 4. All structural components of the vertical lift are positioned on the upper deck and out of the Details of the vertical lift 71 symbolically shown in FIG. 3 are conventional, except for the gripping mechanisms 7. A vertical lift is, for instance disclosed in German Patent Publication DE 102 04 892.4. Such lifts are mounted overhead for movement up and down in the lift shaft 6. The shaft 6 is mounted on the cabin floor of the upper deck 4. All structural components of the vertical lift are positioned on the upper deck and out of the way of any horizontal freight conveyors on the lower deck or floor F. The gripper mechanisms 7 in cooperation with respective latch elements 9 establish automatically an effective connection between the vertical lift 71 and the receptacles 3, 3'. The shaft space 5 is so dimensioned that the gripper mechanisms 7 holding a receptacle can freely move into and along the shaft space 5 when the lift moves up or down inside the shaft space 5. Similarly, the opening 8 in the freight container 1 is sufficient for the gripping mechanisms 7 to pass into the container 1 for engaging the latch elements 9 of a receptacle. The latch elements 9 are preferably attached to the outer edges 31 or corners of the receptacles 3, 3'. However, it is also possible to integrate the latch elements 9 directly into the receptacles if the structure of the receptacle is feasible for such integration of the latch elements 9 into the side walls of the receptacle 3, 3'. The gripper mechanisms 7 are positioned in vertical alignment with the latch elements 9 when a receptacle 3 is in the proper position as determined by the guides 13'. Further, the receptacles 3, 3' are preferably equipped with guide pads 3A cooperating with respective stationary guides 115 in the shaft space 5, whereby the pads 3A slide along the stationary guides 115 when the lift moves a receptacle up or down in the shaft space 5, thereby aligning the lift 71 with the receptacle 3 so that the gripper mechanism 7 and the latch elements 9 can automatically cooperate with each other.

Figure 2:
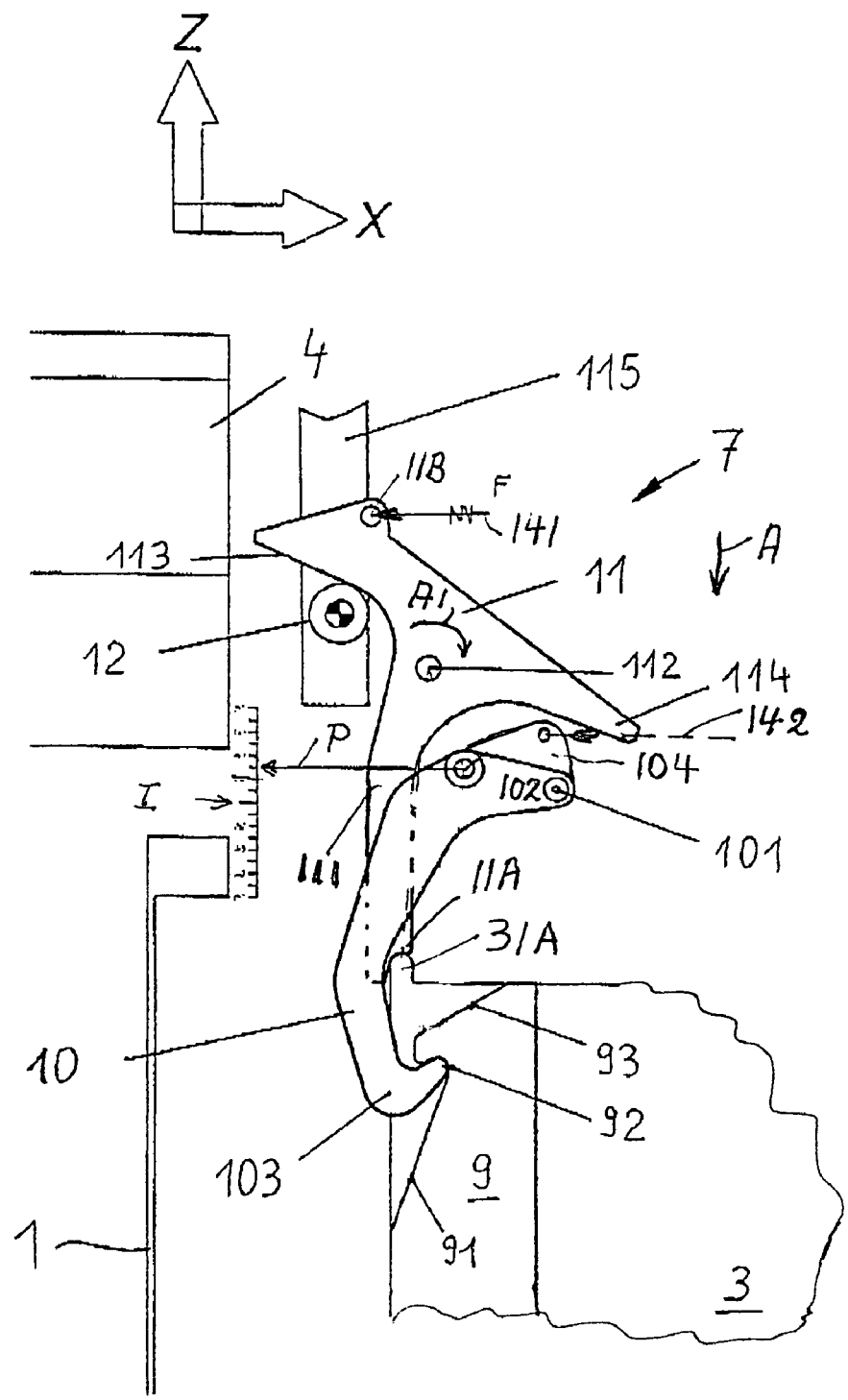
FIG. 2 shows on an enlarged scale compared to FIG. 1, the gripper mechanism with a lifting hook engaging a latch element secured to or forming part of the receptacle to be lifted.

The function of the gripper mechanisms 7 will now be described, particularly with reference to FIGS. 2 and 3 showing a side view and a perspective view of the gripper mechanism 7 respectively. FIGS. 2 and 3 show the gripper mechanism 7 in an interlocked engagement with a respective latch element 9. Each gripper mechanism 7 comprises a lifting hook 10 and a locking pawl 11 as mentioned above. The hook 10 is journalled to a portion 71 of the vertical lift by a journal 102. The locking pawl 11 is journalled to the lift portion by a journal 112 in a position for cooperation with the hook 10. The lift portion 71 is preferably part of a lift slide of the vertical lift. The lifting hook 10 and the locking pawl 11 are mechanically coupled to each other, so that no electrical or mechanical sensors are required for controlling the hook and pawl motions. A claw 103 of the lifting hook 10 can engage a respective recess 92 in the latch element whereby a certain tolerance in the position of the latch elements 9 relative to the hook 10 can be compensated. A stationary activating member 12 is mounted in the lift shaft 6 in such a position that the member 12 can cooperate with a cam track 113 of the locking pawl 11. As the vertical lift slide portion 71 moves downwardly in the direction of the arrow A, the locking pawl 11 will contact with its cam track 113 the stationary activating member 12 that is preferably secured to one of the stationary guides 115 as shown in FIG. 2. The stationary guides 115 are secured to the inner wall of the lift shaft 6. As the downward movement of the lift slide continues, the locking pawl 11 will rotate in the direction of the arrow Al about the journal 112, thereby disengaging the free end 11A of a downwardly reaching arm 111 of the pawl 11 from an upwardly facing edge portion 31A of the receptacle edge 31 since the downwardly reaching arm 111 of the pawl 11 moves with the pawl 11 in the direction of the arrow A1. The downward movement of the lift slide may be indicated by a pointer P on an indicator scale I shown in FIG. 2. Referring further to FIGS. 2 and 3, the activating member 12 of the shown embodiment is a contact bolt which engages the above mentioned cam track 113 of the locking pawl 11. As the lift keeps moving downwardly in the direction of the arrow A, the pawl 11 will slide with its cam track 113 along the bolt activating member 12 which is preferably rotatable about a fixed axis. In a preferred embodiment the activating member 12 is an integral component of the stationary guide 115 which extends longitudinally inside the shaft space 5 of the lift shaft 6. Alternatively, the activating member 12 may be secured to the guide 115. In both instances the guide 115 assures that the locking pawl 11 is properly guided, for example by the engagement of a pin 11B secured to the pawl 11 for traveling along the guide 115, preferably under a biasing force 141 directed from right to left in FIG. 2. Thus, when the cam track 113 travels downwardly along the stationary activating member 12 the biasing force 141 will make sure that the cam track 113 remains engaged with the activating member 12. Accordingly, uncontrolled movements of the locking pawl 11 are prevented. Thus, the locking pawl 11 cannot unlock itself accidentally.

The locking pawl 11 is operatively coupled with the lifting hook 10 through a contact arm 114 of the pawl 11. As the pawl 11 rotates in the direction of the arrow A1 the contact arm 114 will engage an entraining pin 101 of the lifting hook 10 after the arm 111 of the pawl 11 is disengaged with its free end 11A from the upwardly reaching portion 31A of the receptacle edge 31. At this point the receptacle 3 is freely movable upwardly since the latch element 9 has been released from the clamping force exerted by the arm 111 of the pawl 11 and the claw 103 of the hook 10 when the gripping mechanism 7 is fully engaged with the latch element 9. However, when the arm 111 disengages from the edge portion 31A the container 3 actually rests on the intermediate floor 13. As a result, the hook 10 can also be disengaged, which is accomplished by the contact arm 114 of the pawl 11 as it engages the entraining pin 101 of the hook 10, thereby rotating the hook 10 about its journal point 102 also in the direction of the arrow A1. At this point the vertical lift may move slightly downwardly for facilitating the full disengagement of the claw 103 from the pawl recess 92 as will be described in more detail below with reference to FIGS. 4A, 4B and 4C, wherein FIG. 4A shows a full engagement of the hook 10 with the latch 9 as in FIG. 2, while FIG. 4B shows a partially disengaged state, and FIG. 4C shows a fully disengaged state.

As shown in FIG. 4A the cam track 113 has not yet contacted the activating member 12. Thus, the hook 10 of the gripper mechanism 7 is in full engagement with the latch element 9. Resets 14 providing required reset forces such as 141 and 142 are effective on the pawl 11 and on the hook 10 respectively in order to keep the claw 103 of the hook 10 engaged with the latching element 9. The resets 14 may be accomplished, for example by biasing springs 141, 142, such as spiral springs or expansion springs, or gas pressure springs which are effective to exert a torque moment around the journal points 102 and/or 112. Any other suitable biasing force generating elements may also be used which assure a positive engagement of the hook 10 of the gripping mechanism 7 with the latch element 9 of a receptacle as long as the activating member 12 is not effective, that is when the lift is in positions in which the cam track 113 cannot engage the activating member 12. The reset or biasing force 141 is effective on the locking pawl 11 in the direction from right to left in FIG. 2. The reset or biasing force 142 is effective on the lifting hook 10 also from right to left and both reset or biasing forces generate a holding or locking moment that keeps the hook 10 and latch 9 engaged as described above.

FIG. 4B illustrates the position in the further downward motion of the lift 71 in the direction of the arrow A. As the stationary activating member 12 engages the downwardly moving cam track 113, the downwardly reaching arm 111 of the pawl 11 tilts to the left in FIG. 4B against the reset or biasing force 141, thereby releasing the upper edge portion 31A of the upper edge 31 of the receptacle 3. At this point the receptacle 3 rests on the intermediate floor 13 shown in FIG. 1 of the freight container 1. As the lift 71 moves slightly further down as indicated by the different positions of the pointer P relative to the indicating scales I in FIGS. 4A, 4B and 4C, the claw 103 of the hook 10 slides down a disengaging ramp 91 of the latch 9 against the biasing force 142. The motion of the claw 103 along the disengagement ramp 91 begins before the contact arm 114 of the claw 11 engages the entraining pin 101 of the hook 10. Thus, the claw 103 is shifted out of the recess 92 of the latch 9 to move the hook 10 and the claw 11 into the positions shown in FIG. 4C. The pointer P has now reached its substantially lowest point on the indicator scale I.

FIG. 4C shows the completely disengaged position of the gripper mechanism 7 from the latch 9 with the receptacle 3 still fully resting on the floor 13. In this position the container 3 can be moved horizontally either in the X- or preferably in the Y-direction out of the lift alignment position shown in FIG. 1.

The portion of the downward lift motion from the middle position shown in FIG. 4B to the fully down position shown in FIG. 4C makes it possible that a certain tolerance between the latch 9 and the hook 10 is permissible. More specifically, it is, for example, possible that not the entire surface area of the container bottom touches simultaneously the intermediate floor 13. Thus, one corner or one edge can touch first and the other edges or corners may then touch the intermediate floor in sequence.

It has been found that a satisfactory cooperation of the gripper mechanism 7 components 10, 11 with the latch elements 9 is achieved if the journal points 102 of the hook 10 and 112 of the claw 11 form two corner points of a parallelogram. The other two corner points of the parallelogram are formed by the downwardly facing end of the arm 111 and by the tip of the claw 103 when the claw tip and the lower end of the arm 111 are engaged with the latch recess 92 and the edge portion 31A respectively.

The gripping mechanism 7 according to the invention is self-adjusting and makes possible that the receptacle 3 can orient itself in the X-direction, whereby an adaptation of the receptacle, or rather of its positional orientation relative to a horizontal guide system, becomes possible.

A change in the kinematic conditions is also possible. More specifically, it is for example possible to change the distances between the journal points 102 and 112 and/or to change the shape of the cam track 113 or the shape of the contact arm 114 to thereby obtain a different motion pattern compared to the above mentioned parallelogram motion. Such possible adaptations facilitate the cooperation of the vertical lift transport with any horizontal transportation system on the loading floor.

The above description shows how a receptacle 3 is lowered from the upper deck 4 down back into a container 1. In order to transport a receptacle 3 from the lower deck to the main deck 4 the above described sequences or steps proceed in the opposite sequence. Further, it is possible that a full opening of the lifting hook 10 and of the locking pawl 11 is not necessary for a renewed engagement operation, which is contrary to what is shown in FIG. 4C. For this purpose the lift hook 10, or rather the claw 103 of the lift hook 10 can ride along an engagement ramp 93 as the vertical lift moves downwardly along the container 3 standing on the intermediate floor 13. As soon as the claw 103 runs off the ramp 93 the biasing force 142 will assure that the claw 103 engages the recess 92 and the lower end 11A of the locking arm 111 engages the upper edge portion 31A of the receptacle edge 31. Due to the reset or biasing forces 141 and 142 the lifting hook 10 and the locking pawl 11 are automatically shifted into and held in the interlocking position shown in FIG. 4A. Now the lift 71 can move the receptacle 3 from the lower floor or out of the container 1 to the main deck 4.

As shown in FIG. 3, the upwardly reaching portion 31A of the edge 31 of the receptacle 3 is attached to one side of a respective receptacle corner while the corresponding latch element 9 is attached to the other side of the same receptacle corner.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A vertical lift system for transporting a receptacle (3) from one deck to another deck, said vertical lift system comprising a vertically extending stationary lift shaft (5, 6), a vertical lift (71) movable up and down in said stationary lift shaft, at least one stationary activating member (12) mounted in a fixed position in said stationary lift shaft, a number of gripper mechanisms (7) secured to said vertical lift (71) for gripping said receptacle, a number of latch elements (9) secured to said receptacle (3) in positions for engagement with said gripper mechanisms (7), guides (3A, 115) for aligning said gripper mechanisms (7) with said latch elements (9) in said positions for engagement, each gripper mechanism (7) comprising a lifting hook (10) for engaging a respective latch element (9) of said latch elements (9), a locking pawl (11) for locking said lifting hook in a latch element engaging position, and a mechanical coupling operatively interposed between said lifting hook (10) and said locking pawl (11) for automatically coupling and decoupling said locking pawl (11) and said lifting hook (10) in response to a movement direction and an instantaneous position of said vertical lift (71) relative to said receptacle (3) and relative to said stationary activating member (12) for holding said lifting hook (10) in a latched position against forces tending to unhook said lifting hook (10) when said vertical lift (71) moves said receptacle (3) up or down, wherein said lifting hook (10) holds said receptacle (3) against horizontal forces, and wherein said locking pawl (11) holds said receptacle (3) against vertical forces.

2. The vertical lift system of claim 1, wherein said latch elements (9) are secured to side walls of said receptacle (3) at upper corner or edge areas of said receptacle.

3. The vertical lift system of claim 1, wherein said latch elements (9) are recessed in upper corner or edge areas of side walls of said receptacle (3).

4. The vertical lift system of claim 1, wherein said locking pawl (11) comprises a cam track (113), and wherein said stationary activating member (12) is mounted in said fixed position for engaging said cam track (113) of said locking pawl when said vertical lift is reaching an unlocking position, whereby said cam track (113) engages said stationary activating member (12) thereby moving along said stationary activating member (12), said locking pawl (11) comprising a latching arm (111) engaging an upper edge portion (31A) of said receptacle (3) when said cam track (113) is disengaged from said stationary activating member (12), and wherein said latching arm (111) is disengaged from said upper edge portion (31A) when said cam track (113) engages said stationary activating member (12) for preparing a release of said lifting hook (10).

5. The vertical lift system of claim 1, wherein one of said guides (115) is a stationary guide member (115) mounted in said stationary lift shaft (5, 6) in a position for guiding said locking pawl (11) when said vertical lift is moving, said stationary guide member (115) holding said locking pawl (11) in a locked position when said vertical lift is moving.

6. The vertical lift system of claim 1, wherein said mechanical coupling comprises an entraining element (101) on said lifting hook (10) and a contact arm (114) on said locking pawl (11) for engaging said entraining element (101) when said locking pawl (11) is moved by said stationary activating member (12) into a position for automatically disengaging said lifting hook (10) from its latch element (9) of said latch elements.

7. The vertical lift system of claim 6, wherein said entraining element (101) is part of said lifting hook (10) and wherein said contact arm (114) is part of said locking pawl (11), and wherein said stationary activating member (12) is positioned for activating said locking pawl (11) to engage said contact arm (114) of said locking pawl (11) with said entraining element (101) of said lifting hook (10) thereby disengaging said lifting hook (10) from said respective latch (9).

8. The vertical lift system of claim 1, further comprising a first biasing reset (141) operatively connected to said locking pawl (11) and a second biasing reset (142) operatively connected to said lifting hook (10), said first and second biasing resets (141, 142) normally biasing said locking pawl (11) and said lifting hook (10) with a biasing force into a receptacle engaging position, and wherein said locking pawl (11) comprises a cam track (113) with a cam configuration for enabling said stationary activating member (12) to disengage said locking pawl (11) from said lifting hook (10) when said receptacle is to be released from said gripper mechanisms (7) against said biasing force.

9. The vertical lift system of claim 8, wherein said first and second biasing resets (141, 142) comprise springs for exerting said biasing force.

10. The vertical lift system of claim 1, wherein each latch element of said latch elements (9) comprises a hook engagement guide ramp (93) and a latch recess (92) below said hook engagement guide ramp (93), and wherein each lifting hook (10) has a claw (103) at its free hook end, said claw (103) having a claw tip for engaging said latch recess (22), whereby a downward motion of said vertical lift (71) causes said claw (103) to ride down along said hook engagement guide ramp (93), said system further comprising a biasing member (142) effective on said lifting hook (10) for keeping said claw (103) engaged with said hook engagement guide ramp (93) when said claw is riding along said hook engagement guide ramp (93) and for biasing said claw (103) of said lifting hook (10) into engagement with said latch recess (92) of said latch element (9) when said claw (103) slides off said hook engagement guide ramp (93).

11. The vertical lift system of claim 1, wherein each of said latch elements (9) comprises a latch recess (92) and a hook disengagement guide ramp (91) below said latch recess (92), wherein each lifting hook (10) has a claw (103) at its free hook end, said claw (103) riding along said hook disengagement guide ramp (91) in response to a further downward motion of said vertical lift (71) following a hook and latch engagement, for disengaging said lifting hook (10) from its latch element (9), and wherein said stationary activating member (12) is positioned for rotating said lifting hook (10) with its claw (103) out of said latch engagement against a biasing force (141).

12. The vertical lift system of claim 1, further comprising an indicator (I, P) for showing vertical positions of at least one of said gripper mechanisms relative to a fixed scale (I).

13. The vertical lift system of claim 1, wherein said receptacle (3) comprises an upwardly facing edge portion (31A), wherein said locking pawl (11) comprises a downwardly facing arm (111) having a free end (11A) for engaging said upwardly facing edge portion (31A) when said receptacle is latched to said gripper mechanism (7), wherein each latch element (9) has a recess (92) with a downwardly facing surface, and wherein said lifting hook (10) has a claw (103) with an upwardly facing surface for engaging said downwardly facing surface of said recess (92) when said receptacle (3) is latched to said gripper mechanism, whereby a receptacle edge is clamped between said free end (11A) and said claw (103).

14. The vertical lift system of claim 13, wherein said upwardly facing edge portion (31A) is attached to one side of a corner of said receptacle (3) and wherein said latch element (9) is attached to the other side of the same corner of said receptacle (3).

* * * * *